United States Patent [19]

van der Lely et al.

[11] 4,059,160
[45] Nov. 22, 1977

[54] ROTARY HARROWS

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 581,855

[22] Filed: May 29, 1975

Related U.S. Application Data

[60] Division of Ser. No. 394,279, Sept. 4, 1973, which is a continuation of Ser. No. 208,698, Dec. 16, 1971, abandoned.

[30] Foreign Application Priority Data

Dec. 18, 1970 Netherlands .......................... 7018468

[51] Int. Cl.² ............................................. A01B 49/06
[52] U.S. Cl. ........................................ 172/47; 172/59; 172/68; 172/71; 172/776; 111/63
[58] Field of Search .................. 172/59, 49, 47, 63, 172/68-72, 776, 640, 641, 656, 110; 111/59-68

[56] References Cited

U.S. PATENT DOCUMENTS

| 40,403 | 10/1863 | Gray | 172/72 |
|---|---|---|---|
| 89,791 | 5/1869 | Quick | 172/59 |
| 3,316,865 | 5/1967 | Williams | 172/70 X |
| 3,465,828 | 9/1969 | Harris | 172/70 |
| 3,627,059 | 12/1971 | Jackson et al. | 172/68 X |
| 3,661,213 | 5/1972 | Taylor | 172/72 |
| 3,698,489 | 10/1972 | Norrell et al. | 172/776 X |

FOREIGN PATENT DOCUMENTS

| 560,290 | 7/1923 | France | 172/72 |
|---|---|---|---|
| 1,372,483 | 8/1964 | France | 172/68 |
| 1,927,422 | 5/1969 | Germany | 172/110 |
| 1,918,929 | 11/1969 | Germany | 172/72 |
| 1,226,239 | 3/1971 | United Kingdom | 172/72 |

Primary Examiner—Paul E. Shapiro
Attorney, Agent, or Firm—Mason, Mason & Albright

[57] ABSTRACT

A rotary harrow has a transverse frame, including an elongated hollow beam, and rotatable soil working tined members are mounted on upwardly extending shafts journalled in the beam. A supporting elongated roller has arms that adjustably connect to the frame and the roller also extends transverse to the direction of travel, at the rear of the beam. Vertical plate supports on the top of the beam extend upwardly and rearwardly and a tool bar is interconnected to the rearmost extremities of the supports so that seed drills, etc. can be secured in place to the rear of the soil working members. The tool bar also extends transverse and across the width of the frame.

7 Claims, 2 Drawing Figures

ROTARY HARROWS

This application is a division of Ser. No. 394,279 filed Sept. 4, 1973 which is a continuation of Ser. No. 208,698 filed Dec. 16, 1971, now abandoned.

Figure 1:
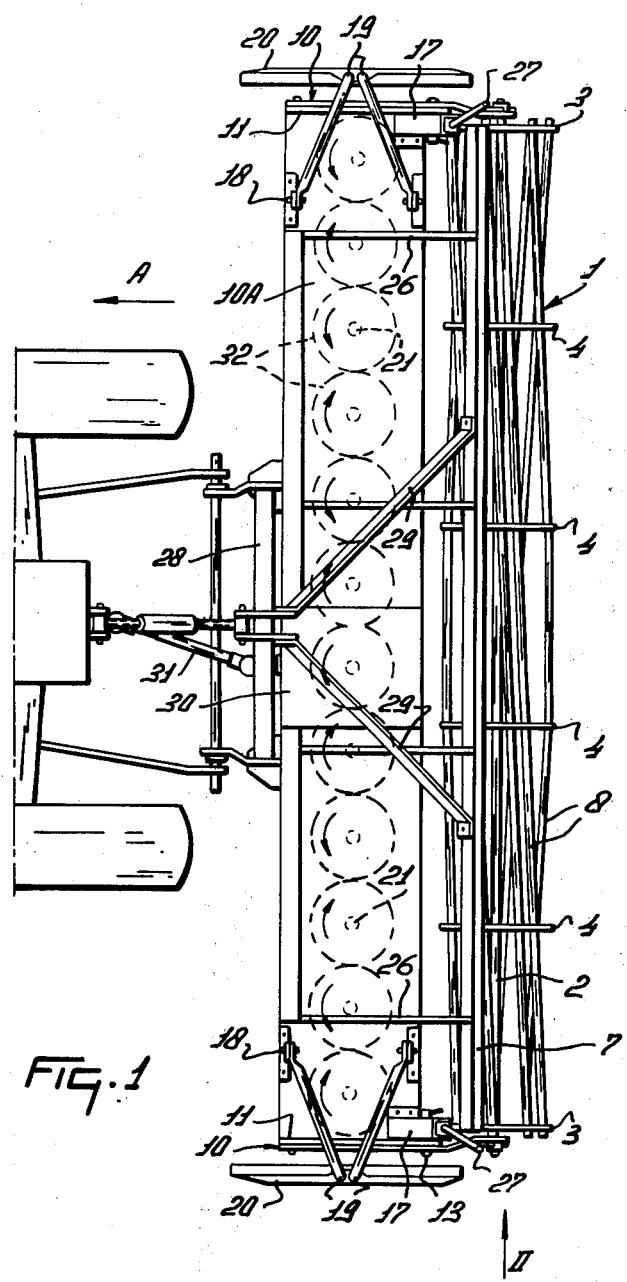
Figure 2:
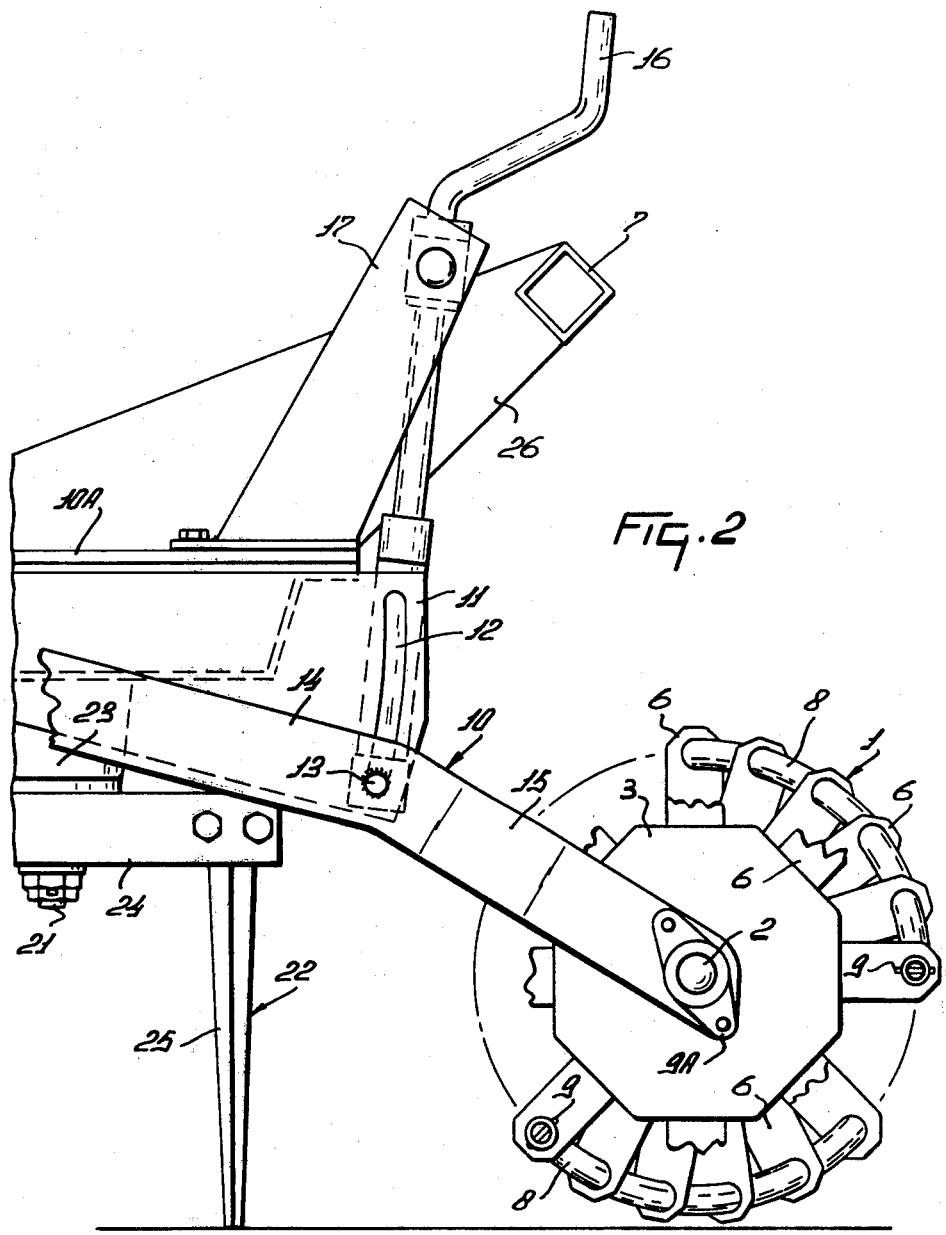

For a better understanding of the invention, and to show how the same may be carried into effect, reference will now be made, by way of example, to the accompanying drawings, in which:

FIG. 1 is a plan view of a cultivator provided with a soil compressing member in accordance with the invention, the cultivator being connected to the rear of an agricultural tractor; and FIG. 2 is an elevation, to an enlarged scale, as seen in the direction indicated by an arrow II in FIG. 1.

Referring to FIGS. 1 and 2 of the drawings, a soil cultivating implement or cultivator is illustrated which includes a soil compressing member 1 which extends substantially horizontally perpendicular to the intended direction of operative travel of the cultivator that is indicated by an arrow A in FIG. 1 of the drawings. The member 1 is of substantially cylindrical overall shape and has a central rotary shaft 2 that is also substantially horizontally perpendicular to the direction A. The member 1 has two plate-like supports 3 at its opposite ends and four further plate-like supports 4 that are arranged between the supports 3 at locations such that the distances between the neighboring supports 4, and between the neighboring supports 3 and 4, are all substantially equal. The supports 3 and 4 are all secured centrally to the shaft 2. Each plate-like support 3 and 4 is of octagonal shape and a corresponding arm 6 projects radially outwardly (with respect to the shaft 2) from the midpoint of each of the eight edges of each support so that angles of 45° are enclosed between the two arms 6 that correspond to two neighboring edges of each vertical support 3 and 4. Adjacent its outermost end, each arm 6 is formed with a hole through which an elongated element in the form of a tube 8 is entered. The angular disposition of the edges of the two octagonal supports 3 with respect to the shaft 2 is the same but the supports 4 that are disposed between them are displaced successively by eighteen degrees around the axis of the shaft 2. As can be seen in FIG. 2 of the drawings in respect of two of the tubes 8, each tube 8 is wound helically around the axis of the shaft 2 and is entered through the holes in the ends of six arms 6 each of which corresponds to a single one of the six supports 3 and 4. The result is that, as seen in side elevation (FIG. 2), each tube 8 subtends a total angle of 90° at the longitudinal axis of the shaft 2. There is, of course, a total of eight of the tubes 8 of which only two tubes are shown in FIG. 2 and it will be noted that the total angle (90°) which each tube 8 subtends at the longitudinal axis of the shaft 2, as seen in side elevation, is double the angle (45°) between successive tubes 8 around the longitudinal axis of the shaft 2. Transverse "safety" pins 9 are entered through opposite end regions of each tube 8 beyond the relatively remote surfaces of the arms 6 that correspond to the two supports 3 and abutment of the pins 9 against said surfaces of the arms 6 prevents displacement of the tubes 8 in the direction of the longitudinal axis of the shaft 2 to any appreciable extent. However, the tubes 8 fit quite loosely in the holes through the outer ends of the arms 6 so that, during operation, the tubes 6 can turn in those holes.

It is by no means essential that the elongated elements should be in the form of the illustrated circular cross-section tubes 8. Elements of angular cross-section may be employed as alternatives and, in either case, the elements may be formed from a resilient material such as spring steel. The elements may also be entirely flexible and be formed from, for example, lengths of strong wire having sheaths of rubber or a synthetic plastics materials. The opposite ends of the central rotary shaft 2 are journalled in horizontal bearings 9A mounted at the rearmost ends, with respect to the direction A, of arms 10 of the cultivator. The leading ends of the arms 10 are turnable upwardly and downwardly with respect to the frame of the cultivator about pivots defining a substantially horizontal axis.

The frame of the cultivator includes a hollow beam 10A that extends substantially horizontally perpendicular to the direction A and thus parallel to the axis or rotation of the shaft 2. The pivotal connections between the leading ends of the arms 10 and the frame of the cultivator are located at the opposite ends of the hollow beam 10A and at the front thereof with respect to the direction A. To this end, vertical plates 11 are provided at the opposite ends of the beam 10A, said plates 11 having a progressively increasing vertical extent in a direction opposite to the direction A (see FIG. 2). The rearmost ends of the plates 11 are formed with curved slots 12 whose centers of curvature coincide with the pivotal connections between the arms 10 and the beam 10A, a horizontal pin 13 rigidly secured to each arm 10 being entered in the corresponding slot 12. Each pin 13 is located approximately midway along the length of the corresponding arm 10 at an angular junction between a forward portion 14 and a rearward portion 15 thereof. The angular junctions are such that the rearward portions 15 are downwardly inclined with respect to the forward portions 14 and it will be noted that, when the pins 13 are located at the upper ends of the slots 12, the corresponding forward portions 14 of the two arms 10 are substantially horizontally disposed while the corresponding rearward portions 15 are still inclined downwardly and rearwardly from said angular junctions with respect to the direction A. As can be seen in plan view (FIG. 1), both rearward portions 15 of the two arms 10 are cranked inwardly with respect to the center of the member 1 so that the opposite ends of the central shaft 2 do not project laterally of the cultivator frame beyond the forward portions 14 of the arms 10.

Each pin 13 is displaceable along the length of the corresponding slot 12 and is pivotally connected to a block that is mounted on the screwthread of a corresponding spindle 16 having a cranked operating handle 17 at its uppermost end. Each spindle is turnable about a horizontal pivot with respect to a corresponding support 17 that projects upwardly from the top of the hollow beam 10A, the parts which effect the connection between the spindle 16 and the pivot in each case being such that the spindle can be rotated readily with respect to said parts but cannot be axially displaced relative thereto to any appreciable extent. The blocks to which the pins 13 are pivotally connected are slidable upwardly and downwardly and rotation of either spindle 16, with the aid of the corresponding handle 27, will thus cause the corresponding pin 13 to be moved either upwardly, or downwardly, along the slot 12 through which it is entered and will thus lower, or raise, the corresponding end of the soil compressing member 1 with respect to the frame of the cultivator.

Plates 20 that are normally substantially vertically disposed, and that extent parallel to the direction A, are located immediately beyond the opposite lateral ends of the beam 10A. The plates 20 are carried by pairs of arms 19 which arems are pivotally connected to the top of the beam 10A by pivots 18 which define axes extending substantially horizontally parallel to the direction A. The plates 20 can turn upwardly and downwardly about said axes to some extent during operation of the cultivator but, when the cultivator is undergoing inoperative transport, the arms 19 that carry the plates 20 can be tilted upwardly through approximately 180° about the corresponding pivots to bring the plates 20 to inverted positions in which they lie on top of the beam 10A at some distance from the opposite ends of that beam.

The hollow beam 10A carries a row of soil working members 22 beneath it that are preferably twelve in number as illustrated in FIG. 1 of the drawings. Each soil working member 22 is carried by a corresponding vertical or substantially vertical shaft 21 that is rotatable in a corresponding bearing 23 at the bottom of the beam 10A. Each shaft 21 carries a tine support 24 at its lower end to which two tines 25 are clamped by bolts. Each tine 25 has an upper fastening portion and a lower soil-engaging portion which is bent over with respect to the fastening portion. The tines 25 will usually be connected to their supports 24 in such a way that the soil-engaging portions thereof trail rearwardly with respect to the direction of rotation of the corresponding shaft 21 but there are operating conditions under which it is preferable that they should project forwardly with respect to said direction of rotation. Each tine 25 is of square of other angular cross-section and tapers progressively in a downward direction towards its tip. The perpendicular distance between the axes of rotation of two neighboring shafts 21 is preferably substantially 25 centimeters and the perpendicular distance between the tips of the two tines 25 of each member 22 is a little greater so that the strips of land worked by the individual members 22 during operation of the cultivator overlap to produce a single broad strip of worked land having a width of substantially 300 centimeters.

Four vertical supporting plates 26 are provided on top of the hollow beam 10A at locations close to the two sets of pivots 18 and at equal distances from the midpoint of the beam 10A. The plates 26 project upwardly and rearwardly beyond the beam 10A with respect to the direction A (see FIG. 2) and their rearmost extremities are interconnected by a supporting beam 7 that extends parallel to the beam 10A and to which seed drills, fertilizer spreaders and/or other individual or combined agricultural implements that are to work in conjunction with the cultivator can be secured. A trestle-shaped coupling member 28 is mounted at the front of the beam 10A with respect to the direction A and can be connected to the three-point lifting device or hitch of an agricultural tractor or other operating vehicle in known manner as illustrated in outline in FIG. 1. Bars 29 that diverge rearwardly with respect to the direction A interconnect the apex of the coupling member 28 and two locations on the supporting beam 7 that are well spaced apart from one another in a direction perpendicular to the direction A.

A gear box 30 is mounted on top of the hollow beam 10A and has its output is driving connection with one of the underlying shafts 21. A rotary input shaft projects forwardly in the direction A from the gear box 30 and can be placed in driven connection with the power take-off shaft of the operating tractor or other vehicle by way of an intermediate telescopic transmission shaft 31 of known construction having universal joints at its opposite ends. The gear box 30 is located above one of the center pair of soil working members 22 and rotation is transmitted from the corresponding shaft 21 to the driving shafts 21 of the other soil working members 22 by a row of spur-toothed pinions 32 located inside the beam 10A with their teeth in successive intermeshing engagement.

In the use of the cultivator which has been described, its coupling member 28 is connected to the three-point lifting device or hitch of a tractor or other operating vehicle in the manner which has been described and the rotary input shaft of the gear box 30 is placed in driven connection with the power take-off shaft of the same tractor or other vehicle by way of the intermediate telescopic transmission shaft 31. As the cultivator is moved over the ground in the direction A, the tines 25 of the rotating soil working members 22 penetrate into, and break up, the surface of the soil, the plates 20 at the opposite ends of the hollow beam 10A acting as shields which can move upwardly and downwardly about the axes defined by the pivots 18 to match undulations in the surface of the ground over which the cultivator is travelling. The lowermost edges of the plates 20 that engage the surface of the ground are so profiled as to move thereover with a sliding action. Apart from its connection to the tractor or other operating vehicle, the cultivator is supported from the ground surface by the soil compressing member 1 and the effective depth of penetration of the tines 25 into the soil can thus be controlled by raising or lowering the level of the axis of rotation of said member 1 with respect to the frame of the cultivator by manipulating the spindle handles 27 as may be required to move the pins 13 upwardly or downwardly along the curved slots 12. The soil compressing member 1 acts to some extent as a roller and consolidates the strip of ground worked by the foregoing tines 25 but its construction is such that any lumps or the like of soil that have been left unbroken by the tines 25 are crumbled to a satisfactory extent by the tubes 8 or other elongated elements of the compressing member 1.

While various features of the soil compressing members and cultivator that have been described, and that are illustrated in the accompanying drawings, are set forth in the following claims as inventive features, it is emphasized that the invention is not necessarily limited to those features and that it includes within its scope all of the parts of the described and/or illustrated soil compressing members and cultivator both individually and in various combinations.

We claim:

1. A rotary harrow having a transverse frame and a plurality of rotatable soil working members, said soil working members being supported on shafts journalled in said transverse frame and rotatable about upwardly extending axes defined by said shafts, said soil working members comprising downwardly extending tines and drive means being connected to rotate said members, a roller connected to said frame and being rotatable about a substantially horizontal axis extending transverse to the direction of travel of the harrow, said roller having a periphery comprised by helical ground-engaging rods and being located at the rear of said frame, coupling means on the front side of said frame and said coupling means comprising connecting points for a multi-point linkage of a prime mover, arms pivotally interconnecting the roller to said frame and adjusting means associating at least one of said arms with said frame to adjust the position of said roller with respect to said frame, said coupling means and said roller affording the main support for the harrow during operation, an elongated tool bar being fixed to said frame by arm means and said tool bar being interconnected to said coupling means by at least on strut bar, said tool bar extending horizontally and across the working width of said harrow at the rear of said members and above said roller, said arm means extending upwardly and rearwardly from the frame with respect to the direction of travel.

2. A harrow as claimed in claim 1, wherein two strut bars interconnect said tool bar to an apex of said coupling means.

3. A rotary harrow as claimed in claim 1, wherein said tool bar is fastened to the top of a transverse beam of said frame and extends substantially parallel to said beam.

4. A harrow as claimed in claim 3, wherein the said tool bar extends throughout the length of said transverse beam.

5. A harrow as claimed in claim 1, wherein said tool bar has a rectangular cross-section and a line connecting two facing angles of that cross-section extends substantially vertically.

6. A harrow as claimed in claim 1, wherein said arm means includes four spaced apart substantially vertical plates and said tool bar is coupled to the uppermost part of a transverse beam of said frame with said plates.

7. A harrow as claimed in claim 1, wherein said tool bar is positioned directly above said roller.

* * * * *